United States Patent [19]
Pelton et al.

[11] 3,733,584
[45] May 15, 1973

[54] SYSTEM FOR REMOTELY CONTROLLING AND ACTIVATING A SEISMIC VIBRATOR

[75] Inventors: Charles R. Pelton; Kim L. Mitchell, both of Ponca City, Okla.

[73] Assignee: Pelton Company, Inc., Ponca City, Okla.

[22] Filed: Mar. 3, 1971

[21] Appl. No.: 115,616

Related U.S. Application Data

[63] Continuation-in-part of Ser. No. 110,872, Jan. 29, 1971.

[52] U.S. Cl......340/15.5 TG, 181/.5 FS, 181/.5 VM, 340/15.5 TA, 328/72
[51] Int. Cl. .............................................G01v 1/02
[58] Field of Search ..............340/15.5 TA, 15.5 TG; 181/.5 FS, .5 VM; 328/72

[56] References Cited

UNITED STATES PATENTS

| | | | |
|---|---|---|---|
| 3,307,648 | 3/1967 | Masterson | 340/15.5 TA |
| 3,079,601 | 2/1963 | Carter et al. | 343/103 |
| 3,220,503 | 11/1965 | Oakley | 340/15.5 TG |
| 3,289,154 | 11/1966 | Cunningham | 340/15.5 TA |
| 3,225,858 | 12/1965 | Pfab | 340/15.5 TG |

*Primary Examiner*—Benjamin A. Borchelt
*Assistant Examiner*—H. A. Birmiel
*Attorney*—Head & Johnson

[57] ABSTRACT

This invention is applicable to seismic prospecting in which a vibrator is used as the source of seismic waves, and the seismic waves are detected, recorded and processed at a recording point remote from the vibrator, after passing through the earth. Means are provided at the vibrators and at the recording point for generating identical unique signals for controlling the vibrator and processing the recorded data. Precise clock and control means at the vibrator and recording point, after being synchronized, are used to control the simultaneous generation of the unique signals.

12 Claims, 2 Drawing Figures

INVENTOR.
CHARLES R. PELTON
KIM L. MITCHELL
BY
Head & Johnson
ATTORNEYS

SYSTEM FOR REMOTELY CONTROLLING AND ACTIVATING A SEISMIC VIBRATOR

CROSS-REFERENCE TO RELATED APPLICATION

This is a continuation-in-part of our copending application, Ser. No. 110,872 entitled "Method and Apparatus for remotely Controlling a Seismic Vibrator" filed Jan. 29, 1971.

BACKGROUND OF THE INVENTION

1. Field of the Invention

This invention is related to the field of seismic geophysical exploration. More particularly it is related to the type of seismic operations in which the source of the seismic waves is an electrically controlled vibrator which, driven by a unique electrical signal, which may be a sweep signal, imparts that unique signal into the earth.

2. Description of the Prior Art

In this type of seismic operation it is required that the unique signal be simultaneously available at the recording and processing station and at the vibrator. In the past this has been done by generating, or recalling from storage, the unique signal, and transmitting this signal by radio to the remote vibrator, while simultaneously recording the unique signal in association with the recording of the seismic waves received after travel through the earth. The simultaneity of the presentation of the unique signal at both locations is critical. Also, the two unique signals must be identical in frequency and phase.

Unfortunately the unique signal after transmission by radio from the recording station to the vibrator is often recorded with a great deal of noise. Thus, the signal is not sufficiently precise to permit the type of processing against the transmitted version of the unique signal, required to interpret the signals transmitted through the earth.

This problem of providing two identical signals has been helped immensely with the invention described in our copending application Ser. No. 110,872. Here, instead of transmitting the unique signal, by radio, to be used to drive the vibrator, which signal can be badly distorted with electrical noise in the process of transmission, we generate the signal independently at the vibrator and at the recording station, so that both signals are identical and substantially free of noise. We do transmit a short signal by radio, but this is a coded signal that is designed to transmit a simple timing pulse, so that the two unique signal generators can be started in unison. Thus, at the two widely separate points, two independent generators are controlled to provide two identical, simultaneously produced unique signals.

SUMMARY OF THE INVENTION

Unfortunately even with the improved system of our application, Ser. No. 110,872, there may be times when the radio noise may be so high, or the distance of transmission may be so great, that the transmission of even the coded time signal may not be satisfactory. We have therefore devised the present invention, which provides a system of operation in which, at the time of unique signal generation, no signal contact of any kind is required, or used, between the recording station and the vibrator.

This is accomplished by having at the recording station and at the vibrator, identical systems for generating the identical desired unique signals. Also, at the two stations are precise clocks and associated counting and control systems. The two control systems and clocks are synchronized at one time by bringing them closely enough together so that electrical conductor transmission between them is possible, or by using the coded timing pulse technique of Ser. No. 110,872. Also, the control systems are identically programmed so that on a selected time schedule, the operations of the vibrator will be carried out. Thereafter the two stations can be widely separated, with the confident knowledge that the identical unique signals will be generated in unison in accordance with the prearranged time schedule.

It is an object of this invention to provide a method of and apparatus for generating, at two widely separated stations, comprising a recording station and a vibrator station, two coincident identical unique signals without communication between the stations at the time of generation. It is a further object of this invention to provide a method of and apparatus for setting the time when such generation will take place, and for setting a selected interval of time at which repetitions of such generation will take place. It is a further object of this invention to provide a method of and apparatus for using the transmission of a coded time pulse from the recording station to the remote station to reset the counters in the control means so as to synchronize the two time counting means.

While we speak of a recording station and a vibrator, this system is of course adaptable to the use of a multiplicity of vibrators, or more generally, a multiplicity of remotely separated stations. Also, while we describe the transmission of the coded time signal from the recording station to the multiplicity of vibrators, it is of course possible to transmit such signal from any one of the stations to any other, or to all of the other stations.

BRIEF DESCRIPTION OF THE DRAWINGS

These and other objects and advantages of this invention will be evident from the following detailed description when read in conjunction with the accompanying drawings which illustrate the invention.

In the drawings.

DESCRIPTION OF THE PREFERRED EMBODIMENTS

Figure 1:
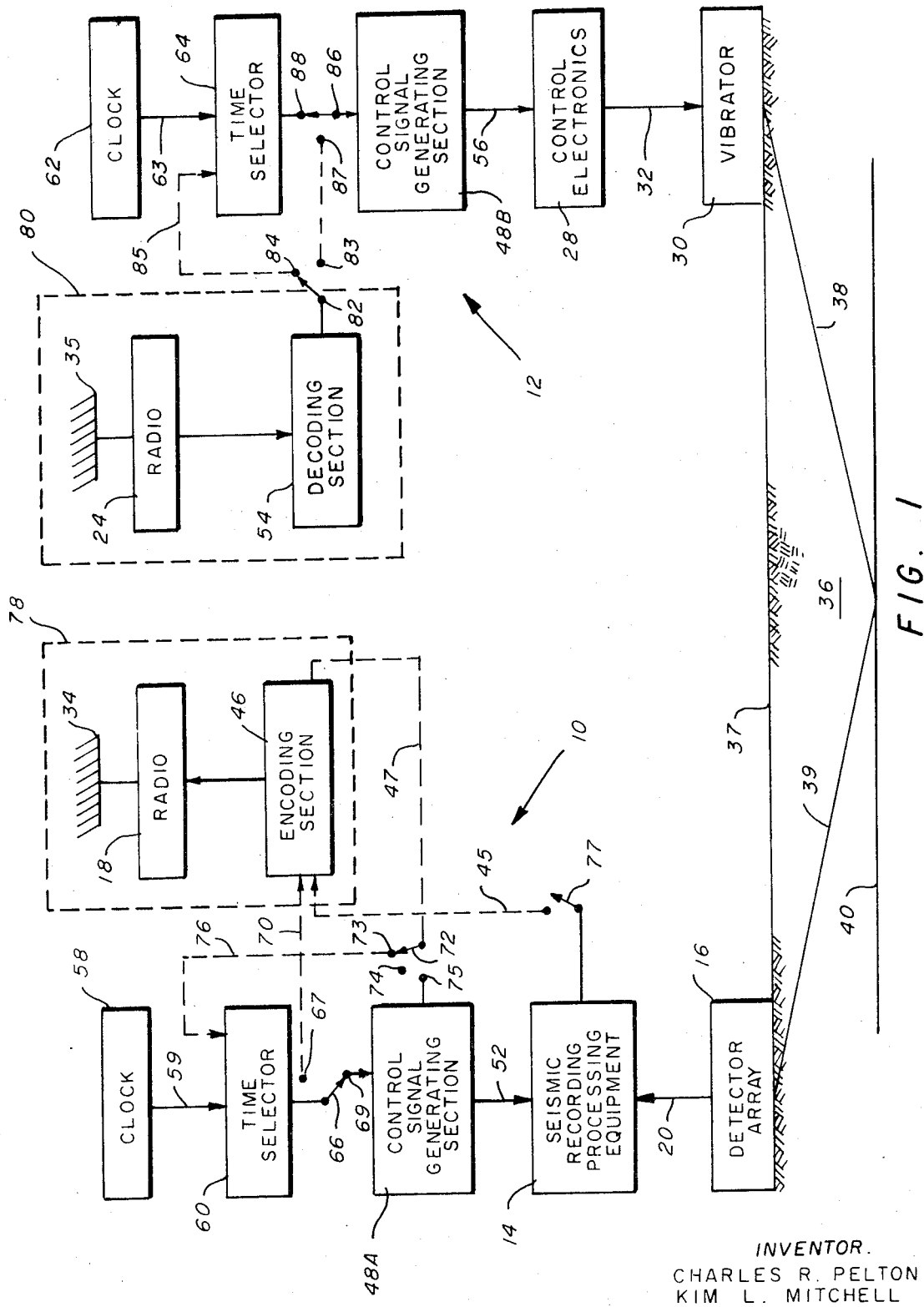
FIG. 1 is a schematic drawing of the equipment used at the recording-processing station and at the vibrator station.

Referring now to the drawings and in particular to FIG. 1 we show in schematic form one embodiment of this invention. Numeral 10 indicates the recording station while 12 indicates the vibrating section, which is distant from the recording station. For the purpose of simplifying the description of this embodiment we will disregard all electrical leads indicated by dashed lines (which represent alternate connections) and apparatus enclosed in dashed boxes 78 and 80, (which indicate alternate apparatus).

At the recording station we show a precision clock 58 which has an output lead 59 on which appear pulses occurring for example once each microsecond. Lead 59 is connected to the input of time selector 60, which will be described in detail in connection with FIG. 2. The time selector has a plurality of electrical counters, which, on signal, count the clock pulses from clock 58, until the total count (representing a time interval of a preselected number of seconds) is reached. When this preselected count is reached, the time selector puts out an electrical pulse on lead 66, 69 to the control signal generating section 48A, which generates a selected unique signal and transmits it to the seismic recording and processing equipment 14.

At the vibrating station 12, we have a similar clock 62 that puts pulses at one second interval on lead 63 to time selector 64. The two time selectors 60 and 64 are identical. Assuming that their counters are synchronized, as will be described more fully below, they start counting together, and both will reach the same predetermined, set-in, total count at the same instant. Thus time selector 64 will send its pulse (indicating the time of reaching the total count) to control signal generating section 48B at the same instant that time selector 60 sends its pulse to generating section 48A.

The two control signal generating sections are identical devices for generating (either by digital computer using programmed logic, or by calling out of digital or analog storage) identical unique signals, such as sweep signals, of a form which are well known for their utility in controlling a seismic vibrator. The particular form of the unique signal, and the method of generating it form no part of this invention since this apparatus will operate with different types of signal generating means. A particularly advantageous form of vibrator control signal generating means is described fully in our copending application Ser. No. 110,872 in connection with FIG. 5 thereof. This descriptive material is incorporated by reference into this application.

To recapitulate we see that when the recording station equipment 10 and the vibrating section equipment 12 are synchronized by setting their respective counters in time selectors 60 and 64 in unison, they can produce identical unique signals simply by setting their counter controls to the same value of total count. Then irrespective of the actual relative positions on the earth's surface 37 that they may be, at the time of the total count, both systems will generate identical unique signals. One will be sent from generator 48B via lead 56 to control electronics, which will send a control signal in the form of the desired unique signal to the vibrator 30, which will transmit this unique signal into the earth via path 38, to a geologic interface 40, where part of the elastic wave energy will be reflected and/or refracted and travel via path 39 to the detector array 16 on the surface of the earth. The array 16 comprises a plurality of vibration detectors which convert the earth vibrations to electrical signals, which are transmitted by leads 20 to the seismic recording-processing equipment 14, where they are phonographically recorded, in a form suitable for later playback and processing. At the same time, of course, as the pulse from 64 goes to 48B, a similar pulse goes from time selector 60 to generator 48A. Thus generator 48A puts out its unique signal which goes via lead 52 to the seismic recording-processing equipment, where it is phonographically recorded in association with the recorded detector signals. Later, after playback the unique signal and the detector signals, which represent the unique signal impressed on the earth by vibrator 30 after traveling through the earth, are mutually processed in ways which form no part of this invention and which are well known in the art. By the term phonographically recorded, we mean recorded in such a way that the record can be played back to recover the original signals. A preferred way of doing this is by means of a magnetic recorder.

DETAILED DESCRIPTION

Of the equipment so far described, the control signal generating sections 48A and 48B are identical and are fully described in detail in Ser. No. 110,872 in connection with FIG. 5 thereof. The seismic recording-processing equipment is well known in the art and needs no further description. Similarly the detector array, the vibrator and the control electronics are well known in the art and need no further description. Clocks 58 and 62 are standard devices available on the market. Their sole requirement is that they have sufficient precision, so that once the two time selectors are synchronized, they will remain synchronized to the required degree after several hours of operation. A precision of three parts in $10^9$ is desired, and can readily be achieved by using as a time reference a temperature controlled quartz oscillator. Since this art is well known, the clocks 58 and 62 will not be described further.

Figure 2:
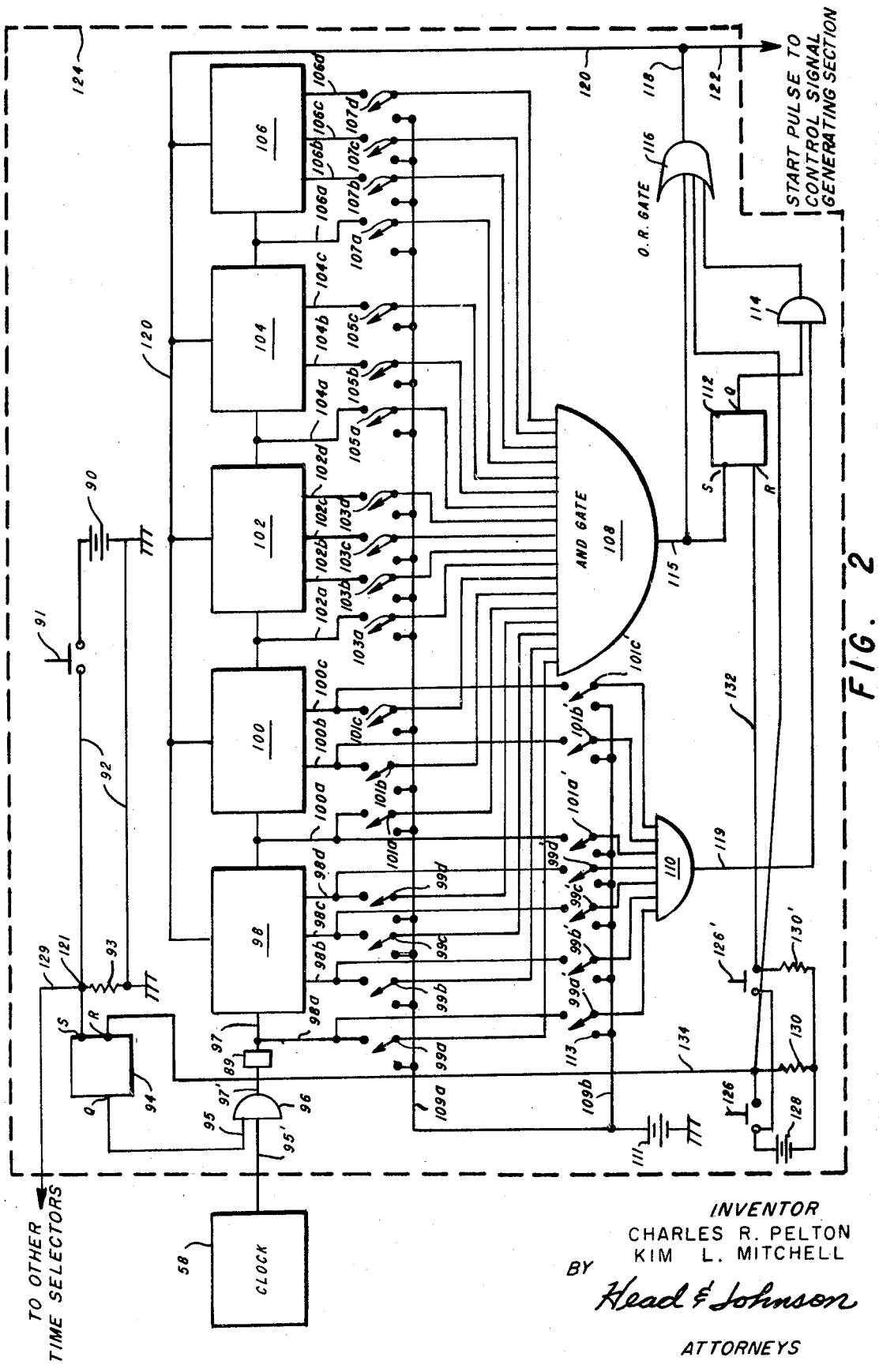
FIG. 2 is a schematic circuit diagram of the time selector units.

The time selectors 60 and 64 will now be described in detail in connection with FIG. 2 which shows one embodiment. The time selector shown in dashed outline 124 is built around a chain of electrical pulse counters 89, 98, 100, 102, 104 and 106 designed to count the pulses from clock 58. To ensure close time synchronization the clock 58 should be high frequency, for example, putting out pulses at one microsecond intervals. Counter 89 then counts each million of these pulses and puts out pulses once each second to the counter 98 via lead 97. A plurality of leads are brought from these counters, representing specific numbers of counts, or specific time intervals. For example, counter 98 has leads 98a, 98b, 98c, 98d. Lead 98a has pulses each second, lead 98b each 2 seconds, 98c each four second, and 98d each eight seconds. Lead 100a from counter 100 has a pulse every 10 seconds, lead 100b each 20 seconds and lead 100c each 40 seconds. Lead 102a has a pulse each 1 minute, lead 102b each 2 minutes, 102c each 4 minutes and 102d each 8 minutes. Lead 104a has a pulse each 10 minutes, 104b each 20 minutes and 104c each 40 minutes, and so on.

Leads 98 go to switches 99 and 99', leads 100 go to switches 101 and 101', leads 102 go to switches 103, leads 104 to switches 105 and leads 106 go to switches 107. All eighteen switches, 99, 101, 103, 105 and 107 go to AND gate 108. The switches 99-107, when not connected to leads 98-106 respectively, have alternate positions 113 that are connected to a bus 109a connected to power supply 111 which places on the bus a potential P equal to the potential of the pulses received from the counters. The AND gate 108 works on the basis that when all 18 leads have a potential P, then the gate closes and puts out a voltage on output lead 115. The time at which this voltage occurs is determined by the specific switches that are closed. For example, if switch 103a is closed to lead 102a, and all other switches are connected to bus 109a, then a pulse will occur on 115 at one minute after the start of count. If switches 103a and 101a are closed, a pulse will occur on 115 at 1 minute plus 10 seconds after the start of count. Thus, by choice of switch closings, any time interval after start of count can be determined and a pulse placed on lead 115.

The operation of the time selector is as follows. The counters 98-106 are started by closing switch 91 which applies a voltage from power supply 90 through conductor 92 to the start lead S of the flip flop 94. This lead S is kept grounded by resistor 93 until the switch is closed. This pulse closes flip flop 94, which acts as a relay which then remains closed, (until a pulse is applied to lead R which resets, or opens, the switch), applying a constant voltage via lead 95 to AND gate 96. The second lead 95' to gate 96 places the one microsecond pulses from clock 58 on the gate, causing with each clock pulse, an output pulse on lead 97' to counter 89. Counter 89 puts out one second pulses on lead 97 to counter 98. Counter 98 (as are also counters 89, 100, 102, 104 and 106) is a conventional electronic pulse counter available on the market, and so require no further detail description. By well known principles these counters place on their output leads, pulses at specific times mentioned above. It is clear then, that once the AND gate 96 is enabled by closing flip flop 94 that the counter train can be set to place a pulse on lead 115 at any desired time thereafter.

As indicated in the drawing, there are two sets of switches 99, and 99' connected to leads 98, and switches 101 and 101' to leads 100. The seven leads from switches 99' go to AND gate 110, which (on the basis described above for gate 108) can be set to place a pulse on output lead 119 at any time up to one minute after the start of count.

The output lead 115 is connected to the flip flop 112 so that a voltage from Q is placed on the AND gate 114. Lead 115 also goes to OR gate 116. The OR gate is a switch which is controlled by any one of its input leads (one or the other). Thus a pulse on lead 115 going to 116 causes a pulse to appear on lead 118, which connects to lead 120 which serves to reset all the counters. The voltage from flip flop 112 to AND gate 114 enables this gate, after which any pulses on lead 119 from gate 110 will go through 114, through 116, to lead 120 to reset the counters.

The overall operation is as follows. Once switch 91 is closed, 94 and 96 operate to start the counters and gates 108 and 110 have been preset by switches 99, 99' etc. to operate at specific counts, the gate 110 generally operating at shorter intervals (of the order of 10-20 seconds) than the gate 108. Because gate 114 is not enabled until gate 108 operates, the cycling of gate 110 does nothing until the preset time of 108, then at that time, gate 114 is enabled, the counters are reset, and then each cycle time set into gate 110 causes a pulse to go out on lead 122 to the control signal generating section to start generating the unique signal. Since the pulse on lead 122 also goes to lead 120, all counters are reset and the counting cycle is repeated at each cycle interval until the switch 126' is closed. Switch 126' places a voltage through lead 132 on flip flop 112 causing it to reset and open, and to stop the cycling operation of gate 110. If switch 126 is also pressed this will reset flip flop 94 and stop the complete operation of the selector. With only switch 126' closed only gate 110 is disabled, while gate 108 continues to count. By setting in a new total count into gates 108 the cycling operation of gate 110 can be continued at any selected time.

If there are two time selectors, it will be clear that a lead 129 can be connected between points 121 of each selector. Then when the switch 91 (of either selector) is closed both selectors will be started simultaneously, and will start counting simultaneously, and if the settings of both gates 108 are the same, pulses will appear simultaneously on leads 122 and both generators will simultaneously provide identical unique signals.

It is well to point out that although contact between the two selectors is required at some prior time, no contact is required at the time of generation of the unique signals. Thus, once synchronized, the two units can thereafter be free of each other and still operate in synchronism. Also, by using two separate switches 126, one each to control flip flops 112 and 94, it is possible to disable flip flop 112 for example, and stop the cycling of gate 110, while still counting on gate 108. Then by resetting gate 108 to some new time, the sequence of operation of gate 110 can be initiated at a second prearranged time, and so on.

While no timing signal is required to operate this system after initial synchronization, it is possible by voice radio, for example for operators of both units to confer and agree on a new value of time setting of gate 108 to compensate for changed conditions. Since with this invention a radio noise condition at the time of operation is of no moment, it is generally possible to find times when the noise level is low enough for voice communication.

ALTERNATE EMBODIMENT

In our copending application, Ser. No. 110,872, we describe in connection with FIGS. 3 and 4 apparatus for coding and decoding a time pulse that can be transmitted by radio and after being received, identified with minimum error, in spite of a high radio noise level. A full detailed description of these devices is provided in that application and is incorporated by reference into this application.

We show in FIG. 1, at the recording station 10, in dashed box 78, alternate equipment including encoding section 46, transmitting radio 18 and antenna 34. Similarly at the vibrating station we show in dashed box 80 antenna 35 leading to receiving radio 24 and decoding station 54. The operation is as follows: at the recording-processing section 14 a pulse is generated at a selected time which goes by way of switch 77 and lead 45 to encoder 46. This provides a coded signal to radio 18 which transmits it over antenna 34. At a fixed time T later the encoder puts out on lead 47, through switch 72, 73 and lead 76 a pulse to time selector 60, this pulse would appear at point 121 and would start the counting operation. At the same time, the transmitted coded signal would be received by antenna 35 and radio 24, and be decoded by 54. The decoding operation is such that at a time precisely corresponding to T, a pulse is generated which goes by lead 82 to 85 to time selector 64, to point 121. Thus, at time T after the pulse is sent to the encoder 60, both time selectors start to count. This is a second method of synchronizing the counting systems, which can be used during intervals when the static and other noise is low enough to permit transmission of a coded timing pulse. Bearing in mind that the time of transmission need not be at the time of operation, synchronized operation can be obtained with this invention even at the time of very high radio noise level.

While we speak of a single vibrator station, this invention can, of course, be carried out with a plurality of vibrator stations each identical to the one station described above, and each capable of being synchronized with each other and with the recording station.

While we have described our invention in terms of specific embodiments, it will be clear that based upon the principles outlined one skilled in the art can devise other embodiments which will operate in accordance with these same principles. All such embodiments are believed to be part of this invention, the scope of which is to be determined by the scope of the appended claims.

What is claimed:

1. In a seismic geophysical system in which a vibrator at a vibrator station imparts into the earth a unique signal of predetermined frequency and phase, which signal is detected at a recording station and phonographically recorded for later playback and processing, the method of simultaneous initiation of said unique signals at said vibrator and said recording stations, when there is no communication between said stations, comprising the steps of:
    a. at each of said vibrator and recording stations generating coincident time pulses at a uniform rate;
    b. at each of said vibrator and recording stations counting said time pulses in a counter means;
    c. temporarily bringing said recording station and said vibrator station into communication before the time selected for generating said unique signals, thence synchronizing said counter means in said recording station with said counter means in said vibrator station to start counting at the same instant, and presetting each of said counter means to a desired total count;
    d. taking said vibrator station and said recording station out of communication with each other; and
    e. when said first preset total count is reached on each of said counters in said vibrator station and in said recording station, simultaneously initiating the generation of identical unique signals in said vibrator station and said recording station.

2. A method as in claim 1 including the additional steps, at said vibrator and recording stations, of resetting said counter means, starting a second counter means, presetting said second counter means to a second total count, and initiating start pulses to start said unique-signal generators upon reaching said second preset total count.

3. A method as in claim 1 including the additional steps of transmitting simultaneous synchronizing pulses to each of said vibrator and recording stations, and responsive to said synchronizing pulses at each station starting said first counter means.

4. A method as in claim 3 including the step of encoding and transmitting at least one of said synchronizing pulses, and at least at one station decoding said transmitted coded synchronizing pulse, and responsive to said decoded coded synchronizing pulse, starting said first counter means.

5. A method as in claim 2 including the steps of resetting said first and second counter means, and thereafter disabling said second counter means, whereby said first counter means will continue to count to its preset total count.

6. A method of claim 5 including the step of moving said vibrator and/or said recording station to a different relative location during the time said first counter is continuing to count to its preset total count.

7. A system of claim 1 wherein said presetting of each of said counter means to a desired total count occurs after taking said vibrator station and said recording station out of communication with each other.

8. In a seismic geophysical system in which a vibrator at a vibrator station imparts into the earth a unique signal of predetermined frequency and phase, which signal is detected at a recording station and phonographically recorded for later playback and processing, including means at said vibrator and recording stations for generating identical unique signals on receipt of a start pulse, the improvement in means for simultaneous initiation of said unique signals at said vibrator and said recording stations while said stations are out of communication with each other, comprising:
    a. precise clock means at each of said stations for generating clock pulses;
    b. clock pulse first counting means at each of said stations;
    c. means for temporarily bringing said vibrator and recording stations into communication to synchronize said clock pulse first counting means at each of said vibrator and recording stations in advance of the time for generating said unique signal;
    d. means for presetting said first counting means; and
    e. means for generating a start pulse at a preselected count in each of said first counting means and for transmitting said start pulses to said means for generating said unique signals simultaneously at said vibrator and recording stations while said stations are not in communication with each other.

9. The seismic geophysical system as in claim 8 including, at each of said vibrator and recording stations, second counting means actuated in response to said preselected count of said first counting means, said second counting means capable of being preset to a selected count to generate said start pulse to reset said first and second counting means.

10. The system of claim 9 including means at each station to recycle said second counting means at the end of its selected count.

11. The seismic geophysical system as in claim 9 including means to disable the counting of said second counting means until the first counting means has reached its first preset total count.

12. The seismic geophysical system as in claim 9 including, after said second counting means has started counting, means for disabling said second counting means, while permitting said first counting means to continue to count.

* * * * *